(12) United States Patent
Shioda et al.

(10) Patent No.: US 6,299,949 B1
(45) Date of Patent: Oct. 9, 2001

(54) LIQUID CRYSTAL DISPLAY DEVICES AND PROCESSES FOR PRODUCING THE SAME

(75) Inventors: Satoshi Shioda; Mikiko Hojo; Kenji Ueda; Shunsuke Sega, all of Tokyo-To (JP)

(73) Assignee: Dai Nippon Printing Co., Ltd. (JP)

( * ) Notice: Subject to any disclaimer, the term of this patent is extended or adjusted under 35 U.S.C. 154(b) by 0 days.

(21) Appl. No.: 09/455,410

(22) Filed: Dec. 6, 1999

(30) Foreign Application Priority Data

Dec. 5, 1998 (JP) ................................. 10-361856

(51) Int. Cl.$^7$ ..................... C09K 19/54; C09K 19/38; G02F 1/3339
(52) U.S. Cl. ..................... 428/1.5; 252/299.5; 349/155; 349/156
(58) Field of Search ............................ 252/299.01, 299.5; 428/1.5, 1.6; 349/155, 156; 430/328

(56) References Cited

U.S. PATENT DOCUMENTS

| 5,729,312 | 3/1998 | Yamagishi et al. ............ 349/86 |
| 5,751,382 | 5/1998 | Yamada et al. .................. 349/12 |
| 5,781,259 | 7/1998 | Shinomiya et al. ............ 349/88 |
| 5,919,606 | * 7/1999 | Kazlas et al. ................. 430/321 |

FOREIGN PATENT DOCUMENTS 0 850 984    7/1998    (EP) .

* cited by examiner

*Primary Examiner*—Shean C. Wu
(74) *Attorney, Agent, or Firm*—Parkhurst & Wendel, LLP

(57) ABSTRACT

Disclosed is a liquid crystal display device which can assure a desired cell gap at the time of heat contact bonding involved in the assembling of cells in a liquid crystal display device and, after the preparation of liquid crystal cells, has excellent reliability, can cope with an increase in cell thickness at high temperatures, and can inhibit a foaming phenomenon in a liquid crystal layer at low temperatures.

The liquid crystal display device comprises: two substrates; a liquid crystal sandwiched and supported between the two substrates; and spacers, for maintaining a predetermined substrate-substrate spacing, provided on at least one of the substrates in its portions where the liquid crystal is sandwiched and supported, the spacers being formed of a photocured resin layer, the photocured resin layer having such properties that, as determined by the measurement of dynamic viscoelasticity in the temperature range of $-40°$ C. to $80°$ C., the storage modulus (E') is not more than $5.0 \times 10^9$ Pa with the loss tangent $\{\tan \delta = E''$ (loss modulus)/E'$\}$ being not more than 0.1 and, as determined by the measurement of dynamic viscoelasticity in the temperature range of $120°$ C. to $180°$ C., the storage modulus (E') is not less than $5.0 \times 10^7$ Pa with the loss tangent $\{\tan \delta = E''$ (loss modulus)/E'$\}$ being not more than 0.3, or alternatively the photocured resin layer having a Young's modulus, derived from a stress-strain curve, of not more than 10,000 MPa at $25°$ C. and not less than 10 MPa at $150°$ C. or a dynamic hardness of 30 to 60 under load.

10 Claims, 5 Drawing Sheets

LIQUID CRYSTAL DISPLAY DEVICES AND PROCESSES FOR PRODUCING THE SAME

TECHNICAL FIELD

The present invention relates to color liquid crystal display devices. More particularly, the present invention relates to liquid crystal display devices, with a liquid crystal being sandwiched and supported between substrates, which can maintain a predetermined substrate-substrate spacing, and processes for producing the same.

BACKGROUND OF THE INVENTION

Liquid crystal display devices have a structure comprising: two transparent substrates, of glass or the like, each having a transparent electrode provided while leaving a gap of about 1 to 10 µm between the two substrates; and a liquid crystal material filled into the gap. In this liquid crystal display devices, a voltage is applied across the electrodes to align the liquid crystal in a given direction to create transparent portions and opaque portions, thereby displaying images. In color liquid crystal display devices, a color filter composed of colored layers of three colors corresponding to the three primary colors of light, red (R), green (G), and blue (B), and a black matrix layer (Bk) suitably disposed among the three colored layers is provided on any transparent electrode substrate, and the three primary colors are added by shutter operation of the liquid crystal to display desired colors.

The color filter for color liquid crystal display devices comprises a transparent substrate, colored layers, a protective layer, and a transparent conductive layer stacked in that order on top of one another. In this case, the gap between the color filter and the transparent substrate having thereon electrodes or thin-film transistors provided so as to face the positions of R, G, B, and Bk is maintained at several µm, and a liquid crystal material is filled into the gap to form a liquid crystal display device.

Color liquid crystal display devices are classified into a simple matrix system and an active matrix system according to the drive method of the liquid crystal. In recent years, by virtue of excellent image quality, close control of the individual pixels, and high operating speed, the active matrix system has become adopted for display devices for personal computers and the like.

In the liquid crystal display device of the active matrix system, a thin-film transistor (TFT) device is provided on a glass substrate for each pixel, and the shutter operation of the liquid crystal in each pixel is controlled by the switching operation of each TFT device. A uniform transparent electrode film as a counter electrode is provided so as to face these TFT devices.

Tin oxide, indium oxide, or a composite oxide of these oxides called "ITO" is used in the transparent electrode film. The transparent electrode film may be formed by various methods, such as vapor deposition, ion plating, and sputtering. Since, however, the protective layer as a layer underlying the transparent electrode for color filters is formed of a synthetic resin, the transparent electrode should be formed at a relatively low temperature from the viewpoint of the heat resistance of the protective layer. For this reason, sputtering has been extensively used for the production of transparent electrodes for color filters.

FIG. 4 is a cross-sectional view of a liquid crystal display device using TFT. As shown in FIG. 4, the construction of a liquid crystal display device 41 is such that a color filter 42 disposed so as to face an opposed substrate 43, with TFT formed thereon, while leaving a predetermined spacing between the color filter 42 and the TFT substrate 43 and the color filter is joined to the TFT substrate with the aid of a sealant 44 comprising reinforcing fibers incorporated into an epoxy resin or the like. The space defined by the color filter and the TFT substrate is filled with a liquid crystal 45. When the spacing between the color filter and the TFT substrate is not accurately maintained, a variation in thickness of the liquid crystal layer occurs. This thickness difference causes a difference in optical rotatory power in the liquid crystal, leading to unfavorable phenomena, such as coloration of the liquid crystal, or unsatisfactory color display due to color shading. In order to avoid these unfavorable phenomena, an attempt to accurately maintain the spacing between the color filter and the TFT substrate has been made by incorporating a large number of synthetic resin, glass, alumina, or other material particles or rods having a size of 3 to 10 µm, called "spacer" 46, into the liquid crystal, or by using a spacer formed of a patterned photocured resin layer or the like.

When the particles or rods are used as the spacer, they are incorporated, in a large amount of about 100 particles or rods/mm$^2$, into the liquid crystal. Therefore, filling of a mixture of the spacer particles or rods with a highly viscous liquid crystal into the space between the color filter and the TFT substrate sometimes poses a problem that the spacer particles or rods are not homogeneously dispersed in the liquid crystal and are localized in part of the liquid crystal. This phenomenon deteriorates the display quality in a portion where the spacer is localized, and, in addition, poses an additional problem associated with accurately maintaining the spacing between the color filter and the TFT substrate. Previously spreading a spacer on the color filter by a wet or dry process requires a special device for attaining even spacer density distribution at the time of spreading and, at the same time, requires a device for preventing the spacer from moving at the time of filling of the liquid crystal.

The spacer formed of a patterned cured resin layer or the like should satisfy the following requirements. Specifically, in the preparation of liquid crystal cells, sealing is performed at a temperature of 120 to 180° C. Regarding this heat contact bonding, ensuring a desired cell gap is required. Further, after the preparation of the liquid crystal cells, in consideration of a fluctuation in optical properties or liquid crystal layer thickness due to a temperature change of the liquid crystal layer at the time of a reliability test or during the operation of the liquid crystal display device, the liquid crystal display device should cope with an increase in cell thickness at high temperatures and can inhibit a low-temperature foaming phenomenon in the liquid crystal layer at low temperatures.

DISCLOSURE OF THE INVENTION

Accordingly, it is an object of the present invention to provide a liquid crystal display device which can assure a desired cell gap at the time of heat contact bonding involved in the assembling of cells in a liquid crystal display device and, after the preparation of liquid crystal cells, has excellent reliability, can cope with an increase in cell thickness at high temperatures, and can inhibit a foaming phenomenon in a liquid crystal layer at low temperatures.

According to one aspect of the present invention, there is provided a first liquid crystal display device comprising: two substrates; a liquid crystal sandwiched and supported between the two substrates; and spacers, for maintaining a predetermined substrate-substrate spacing, provided on at least one of the substrates in its portion where the liquid crystal is sandwiched and supported, the spacers being formed of a photocured resin layer, the photocured resin layer having such properties that, as determined by the measurement of dynamic viscoelasticity in the temperature range of −40° C. to 80° C., the storage modulus (E') is not more than $5.0 \times 10^9$ Pa with the loss tangent {tan δ=E" (loss modulus)/E'} being not more than 0.1 and, as determined by the measurement of dynamic viscoelasticity in the temperature range of 120° C. to 180° C., the storage modulus (E') is not less than $5.0 \times 10^7$ Pa with the loss tangent {tan δ=E" (loss modulus)/E'} being not more than 0.3.

According to another aspect of the present invention, there is provided a second liquid crystal display device comprising: two substrates; a liquid crystal sandwiched and supported between the two substrates; and spacers, for maintaining a predetermined substrate-substrate spacing, provided on at least one of the substrates in its portion where the liquid crystal is sandwiched and supported, the spacers being formed of a photocured resin layer, the photocured resin layer having a Young's modulus, derived from a stress-strain curve, of not more than 10,000 MPa at 25° C. and not less than 10 MPa at 150° C.

According to still another aspect of the present invention, there is provided a third liquid crystal display device comprising: two substrates; a liquid crystal sandwiched and supported between the two substrates; and spacers, for maintaining a predetermined substrate-substrate spacing, provided on at least one of the substrates in its portion where the liquid crystal is sandwiched and supported, the spacers being formed of a photocured resin layer, the photocured resin layer having a dynamic hardness of 30 to 60 under load.

In the first to third liquid crystal display devices, preferably, the photocured resin layer is a cured layer which has been formed from a photocurable resin composition, the photocurable resin composition comprising: a copolymer resin; a bifunctional or higher polyfunctional photopolymerizable acrylate monomer or oligomer; an epoxy resin; and an initiator, the copolymer resin comprising 5 to 55% by mole of constituent units represented by formula (1) and 5 to 95% by mole of constituent units represented by formula (2), the constituent units represented by formula (1) having been partially reacted, through carboxyl groups thereof, with a (meth)acryloylalkyl isocyanate compound, the constituent units represented by formula (2) having been partially reacted, through hydroxyl groups thereof, with a (meth)acryloylalkyl isocyanate compound, said copolymer resin containing 5 to 95% by mole of (meth)acryloyl groups and having an acid value of 5 to 400 mg KOH/g and a weight average molecular weight of 10,000 to 1,000,000 as determined using polystyrene as a standard:

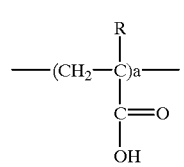
(1)

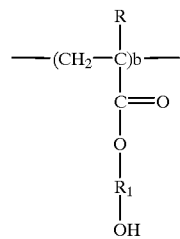
(2)

wherein R represents hydrogen or an alkyl group having 1 to 5 carbon atoms and $R_1$ represents an alkylene group having 2 to 4 carbon atoms.

Preferably, the copolymer resin further comprises 0 to 75% by mole of constituent units represented by formula (3) and 0 to 75% by mole of constituent units represented by formula (4):

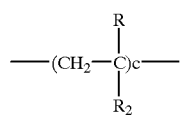
(3)

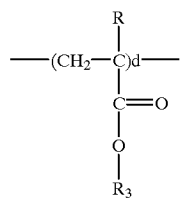
(4)

wherein R represents hydrogen or an alkyl group having 1 to 5 carbon atoms, $R_2$ represents an aromatic carbon ring, and $R_3$ represents an alkyl group or an aralkyl group.

According to a further aspect of the present invention, there is provided a process for producing the first liquid crystal display device, comprising the steps of: providing substrates between which a liquid crystal for a liquid crystal display device is to be sandwiched and supported; coating a photosensitive resin composition onto at least one of the substrates in its portion, where the liquid crystal is to be sandwiched and supported, to a thickness of spacers; providing a photomask, on the coating, such that light is not applied to the coating in its portions other than spacer-forming portions; exposing the coating; and developing the exposed coating to form a photocured resin layer as spacers, the photocured resin layer having such properties that, as determined by the measurement of dynamic viscoelasticity in the temperature range of −40° C. to 80° C., the storage modulus (E') is not more than $5.0 \times 10^9$ Pa with the loss tangent {tan δ=E" (loss modulus)/E'} being not more than 0.1 and, as determined by the measurement of dynamic viscoelasticity in the temperature range of 120° C. to 180° C., the storage modulus (E') is not less than $5.0 \times 10^7$ Pa with the loss tangent {tan δ=E" (loss modulus)/E'} being not more than 0.3.

According to a still further aspect of the present invention, there is provided a process for producing the second liquid crystal display device, comprising the steps of: providing substrates between which a liquid crystal for a liquid crystal display device is to be sandwiched and supported; coating a photosensitive resin composition onto at least one of the substrates in its portions, where the liquid crystal is to be sandwiched and supported, to a thickness of spacers; providing a photomask, on the coating, such that light is not applied to the coating in its portions other than spacer-forming portions; exposing the coating; and developing the exposed coating to form a photocured resin layer as spacers, the photocured resin layer having a Young's modulus, derived from a stress-strain curve, of not more than 10,000 MPa at 25° C. and not less than 10 MPa at 150° C.

According to another aspect of the present invention, there is provided a process for producing the third liquid crystal display device, comprising the steps of: providing substrates between which a liquid crystal for a liquid crystal display device is to be sandwiched and supported; coating a photosensitive resin composition onto at least one of the substrates in its portions, where the liquid crystal is to be sandwiched and supported, to a thickness of spacers; providing a photomask, on the coating, such that light is not applied to the coating in its portions other than spacer-forming portions; exposing the coating; and developing the exposed coating to form a photocured resin layer as spacers, the photocured resin layer having a dynamic hardness of 30 to 60 under load.

In the processes for producing the first to third liquid crystal display devices according to the present invention, preferably, the photocurable resin composition comprises: a copolymer resin; a bifunctional or higher polyfunctional photopolymerizable acrylate monomer or oligomer; an epoxy resin; and an initiator, the copolymer resin comprising 5 to 55% by mole of constituent units represented by formula (1) and 5 to 95% by mole of constituent units represented by formula (2), the constituent units represented by formula (1) having been partially reacted, through carboxyl groups thereof, with a (meth)acryloylalkyl isocyanate compound, the constituent units represented by formula (2) having been partially reacted, through hydroxyl groups thereof, with a (meth)acryloylalkyl isocyanate compound, said copolymer resin containing 5 to 95% by mole of (meth)acryloyl groups and having an acid value of 5 to 400 mg KOH/g and a weight average molecular weight of 10,000 to 1,000,000 as determined using polystyrene as a standard.

Preferably, the copolymer resin further comprises 0 to 75% by mole of constituent units represented by formula (3) and 0 to 75% by mole of constituent units represented by formula (4).

BEST MODE FOR CARRYING OUT THE INVENTION

Figure 1:
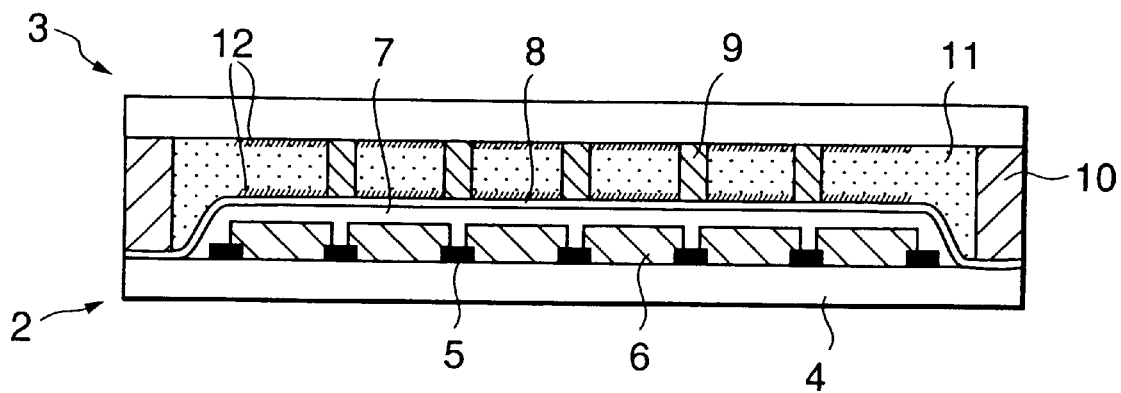
FIG. 1 is a partially sectional view showing one embodiment of the liquid crystal display device according to the present invention.

The first to third liquid crystal display devices and the processes for producing the first to third liquid crystal display devices according to the present invention are characterized by spacers. In the first to third liquid crystal display devices and the processes for producing the first to third liquid crystal display devices according to the present invention, a photosensitive resin composition comprising a photopolymerizable acrylate oligomer and, added to the oligomer, a bifunctional or higher polyfunctional photopolymerizable acrylate monomer or oligomer, an epoxy resin, and a photopolymerization initiator is used as a material for spacers in order to impart the specified storage modulus, loss tangent, Young's modulus, and dynamic hardness to the spacers.

Preferred photopolymerizable acrylate oligomers include those having a molecular weight of about 1000 to 2000, for example, polyester acrylates, epoxy acrylates, such as phenol novolak epoxy acrylates and o-cresol novolak epoxy acrylates, polyurethane acrylates, polyether acrylates, oligomer acrylates, alkyd acrylates, polyol acrylates, and melamine acrylates. More specific examples of preferred photopolymerizable acrylate oligomers are the following specific copolymer resins.

The use of the following specific copolymer resins can impart the specified storage modulus, loss tangent, Young's modulus, and dynamic hardness to the spacers, and, in addition, can regulate the content of radically polymerizable groups, such as alkali-soluble groups and (meth)acryloyl groups and can realize a photosensitive resin composition possessing excellent curability, alkali solubility, and coatability.

The specific copolymer resin basically contains constituent units comprising (meth)acryloyl groups introduced into constituent units represented by formula (1) and constituent units comprising (meth)acryloyl groups introduced into constituent units represented by formula (2). If necessary, the copolymer resin may further contain constituent units represented by formula (3) and constituent units represented by formula (4). As used herein, the term "(meth)acryloyl group" refers to a methacryloyl group or an acryloyl group, and the term "(meth)acrylic acid" refers to methacrylic acid or acrylic acid.

In formulae (1) to (4), R represents hydrogen or an alkyl group having 1 to 5 carbon atoms. Examples of alkyl groups usable herein include methyl, ethyl, n-propyl, isopropyl, n-butyl, isobutyl, sec-butyl, tert-butyl, and n-pentyl groups.

The constituent units represented by formula (1) contribute to alkali developability. Monomers usable for introducing the constituent units represented by formula (1) include, for example, acrylic acid, methacrylic acid, 2-carboxy-1-butene, 2-carboxy-1-pentene, 2-carboxy-1-hexene, and 2-carboxy-1-heptene. The content of the constituent units represented by formula (1) is regulated according to the level of alkali solubility required of the copolymer resin and is generally 5 to 55% by mole, preferably 10 to 25% by mole.

The constituent units represented by formula (2) are basically those in which (meth)acryloyl groups are introduced. Examples of $R_1$ include ethylene, propylene, and butylene groups. Monomers usable for introducing the constituent units represented by formula (2) include 2-hydroxyethyl acrylate, 2-hydroxyethyl methacrylate, 2-hydroxypropyl acrylate, 2-hydroxypropyl methacrylate, 4-hydroxybutyl acrylate, and 4-hydroxybutyl methacrylate.

The constituent units represented by formula (2) have been partially reacted through hydroxyl groups thereof with the (meth)acryloylalkyl isocyanate compound to introduce (meth)acryloyl groups therein. The content of the constituent units represented by formula (2) is regulated according to the level of photopolymerizability required of the copolymer resin and is generally 5 to 95% by mole, preferably 10 to 50% by mole.

The constituent units represented by formula (3), when the copolymer resin is used in the formation of a coating, function to impart coatability to the copolymer resin. Examples of $R_2$ usable herein include aromatic rings such as phenyl and naphthyl groups. Monomers usable for introducing the constituent units represented by formula (3) include styrene and α-methylstyrene. The aromatic ring may be substituted by a halogen atom, such as chlorine or bromine, an alkyl group, such as a methyl or ethyl group, an amino group, such as an amino or dialkylamino group, a cyano group, a carboxyl group, a sulfonic acid group, phosphoric acid group or the like.

The content of the constituent units represented by formula (3) is 0 to 75% by mole, preferably 5 to 50% by mole.

The constituent units represented by formula (4), when the copolymer resin is used to render the copolymer resin alkali-developable, inhibit alkali development. Examples of $R_3$ usable herein include alkyl groups having 1 to 12 carbon atoms and aralkyl groups, such as benzyl and phenylethyl groups. Monomers usable for introducing the constituent units represented by formula (4) include (meth)acrylic esters, such as methyl (meth)acrylate, ethyl (meth)acrylate, butyl (meth)acrylate, 2-ethylhexyl (meth)acrylate, phenyl (meth)acrylate, cyclohexyl (meth)acrylate, dicyclopentanyl (meth)acrylate, dicyclopentanyloxyethyl (meth)acrylate, isobornyl (meth)acrylate, benzyl (meth)acrylate, and phenylethyl (meth)acrylate. The content of the constituent units represented by formula (4) is 0 to 75% by mole, preferably 5 to 50% by mole.

For the introduction of the constituent units represented by formulae (1) to (4), the monomers exemplified above respectively for these constituent units may be used alone or as a mixture of two or more.

Preferred polymerization solvents usable for the production of a specific polymer comprising constituent units represented by formulae (1) to (4) include solvents free from active hydrogen, such as hydroxyl and amino groups. Examples thereof include: ethers, such as tetrahydrofuran; glycol ethers, such as diethylene glycol dimethyl ether, diethylene glycol diethyl ether, diethylene glycol methyl ethyl ether; cellosolve esters, such as methyl cellosolve acetate; propylene glycol monomethyl ether acetate; and 3-methoxybutyl acetate. Aromatic hydrocarbons, ketones, esters and the like are also usable.

Polymerization initiators commonly known as radical polymerization initiators may be used. Specific examples thereof include: azo compounds, such as 2,2'-azobisisobutylonitrile, 2,2'-azobis-(2,4-dimethylvaleronitrile), 2,2'-azobis-(4-methoxy-2,4-dimethylvaleronitrile); organic peroxides, such as benzoyl peroxide, lauroyl peroxide, tert-butyl peroxypivalate, and 1,1'-bis-(tert-butylperoxy)cyclohexane; and hydrogen peroxide. When a peroxide is used as the radical polymerization initiator, the peroxide may be used in combination with a reducing agent for use as a redox type polymerization initiator.

In the production of a specific polymer comprising constituent units represented by formulae (1) to (4), molecular weight modifiers may be used to modify the weight average molecular weight. Examples of molecular weight modifiers usable herein include: halogenated hydrocarbons, such as chloroform and carbon tetrabromide; marcaptans, such as n-hexylmercaptan, n-octylmercaptan, n-dodecylmercaptan, tert-dodecylmercaptan, and thioglycollic acid; xanthogens, such as dimethylxanthogen disulfide and diisopropylxanthogen disulfide; terpinolene; and α-methylstyrene dimer.

The specific polymer comprising constituent units represented by formulae (1) to (4) may be a random or block copolymer of monomers for the constituent units represented by formulae (1) to (4).

The random copolymer may be produced by adding dropwise a composition comprising monomers and a catalyst to a polymerizer containing a solvent at a temperature of 80 to 110° C. over a period of 2 to 5 hr, followed by ripening.

The specific polymer comprising the constituent units represented by formulae (1) to (4) has a weight average molecular weight, as determined using polystyrene as the standard (hereinafter referred to simply as "weight average molecular weight" or "Mw"), in the range of 10,000 to 1,000,000, an acid value of 5 to 400 mg KOH/g, and a hydroxyl value of 5 to 400 mg KOH/g.

The specific copolymer resin is obtained by reacting the specific polymer comprising constituent units represented by formulae (1) to (4) with a (meth)acryloyl-containing isocyanate compound.

The (meth)acryloylalkyl isocyanate compounds usable herein is one wherein a (meth)acryloyl group is bonded to an isocyanate group (—NCO) through an alkylene group having 2 to 6 carbon atoms. Specific examples thereof include 2-acryloylethyl isocyanate and 2-methacryloylethyl isocyanate. 2-Methacryloylethyl isocyanate is commercially available from Showa Denko K.K. under the designation of "Karenz MOI" and the like.

The reaction of the copolymer comprising the constituent units represented by formulae (1) to (4) with the (meth) acryloylalkyl isocyanate compound may be carried out by adding dropwise the isocyanate compound to a solution of the copolymer in the presence of a minor amount of a catalyst. Catalysts usable herein include dibutyltin laurate. In the reaction, polymerization inhibitors, such as p-methoxyphenol, hydroquinone, naphthylamine, tert-butyl catechol, and 2,3-di-tert-butyl p-cresol, may be used according to need.

The (meth)acryloylalkyl isocyanate compound is added and bonded to the constituent units represented by formula (2) in the specific polymer comprising the constituent units represented by formulae (1) to (4) through a urethane bond, and bonded to a part of the constituent units represented by formula (1) in the specific copolymer through an amido bond with evolution of carbon dioxide gas.

Specifically, a product obtained by a reaction between the copolymer comprising the constituent units represented by formulae (1) and (2) and the (meth)acryloylalkyl isocyanate compound is represented by formula (5):

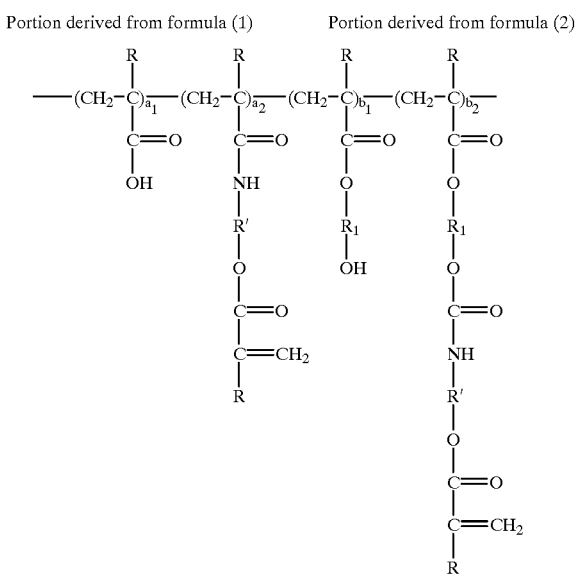

(5)

wherein R and $R_1$ each are as defined above in connection with formulae (1) to (4), R' represents an alkylene group having 2 to 6 carbon atoms, $a_1+a_2$ is a defined in formula (1), and $b_1+b_2$ is b defined in formula (2).

The rate of the reaction of the (meth)acryloylalkyl isocyanate compound with hydroxyl groups in the constituent units represented by formula (2) is about 20 times higher than that of the reaction of the (meth)acryloylalkyl isocyanate compound with carboxyl groups in the constituent units represented by formula (1). Therefore, the (meth) acryloyl group is mainly introduced into the constituent units represented by formula (2), and, in the constituent units represented by formula (1), most of the carboxyl groups remains unreacted even though the (meth)acryloyl group is introduced into a part of the carboxyl groups.

In connection with formula (5), regarding the portion derived from formula (2), the proportion of units with an index $b_1$ in the copolymer resin may be 0 to 10% by mole, and the proportion of units with an index 2 in the copolymer resin may be 5 to 95% by mole, provided that the total of the proportion of units with an index $b_1$ and the proportion of units with an index $b_2$ is 5 to 95% by mole, while regarding the portion derived from formula (1), the proportion of units with an index al in the copolymer resin may be 5 to 55% by mole, and the proportion of units with an index $a_2$ in the copolymer resin may be 0 to 10% by mole, provided that the total of the proportion of units with an index $a_1$ and the proportion of units with an index $a_2$ is 5 to 55% by mole. Thus, the amount of the (meth)acryloyl group introduced can be regulated.

The weight average molecular weight of the copolymer resin is generally 10,000 to 1,000,000, preferably 20,000 to 100,000. When the weight average molecular weight is smaller than 10,000, the developability is excessively good. This makes it difficult to control pattern shapes at the time of pattern-wise exposure. Even though patterns could be formed, a problem occurs such as a reduction in final coating thickness. On the other hand, when the weight average molecular weight exceeds 1,000,000, the viscosity of the copolymer resin in the form of a resist is so high that the coatability is lowered. Further, in this case, the developability is deteriorated. This makes it difficult to form sharp patterns.

The amount of the (meth)acryloyl group introduced is generally 5 to 95% by mole, preferably 10 to 50% by mole. When the amount is less than 5% by mole, the photocurability is low and the effect of improving coating adhesion and resist properties is small.

The acid value of the copolymer resin is generally 5 to 400 mg KOH/g, preferably 10 to 200 mg KOH/g. The acid value correlates with the alkali developability. Specifically, an acid value below the lower limit of the above range leads to problems such as poor developability and poor adhesion to the substrate and the color filter resin. On the other hand, an acid value above the upper limit of the above range provides excessively good developability, posing problems including the difficulty of regulating pattern shapes at the time of pattern-wise exposure. In the copolymer resin, the hydroxyl group in the constituent units represented by formula (2) is not always required to be left, and the hydroxyl value may be 0 to 200 mg KOH/g. However, the hydroxyl group may be left to effectively regulate the solubility of the copolymer resin in the solvent.

The specific copolymer resin will be exemplified. For all the copolymer resins exemplified below, the constituent units represented by formula (1) are derived from 2-hydroxyethyl methacrylate (HEMA) as a monomer, and the constituent units represented by formula (2) are derived from acrylic acid (AA) as a monomer. Further, the constituent units represented by formula (1) have been partially reacted, through carboxyl groups thereof, with 2-methacryloylethyl isocyanate (Karenz MOI, manufactured by Showa Denko K.K.), and the constituent units represented by formula (2) have been partially reacted, through hydroxyl groups thereof, with 2-methacryloylethyl isocyanate (Karenz MOI, manufactured by Showa Denko K.K.). The constituent units represented by formula (3) are derived from styrene (St) as the monomer, and the constituent units represented by formula (4) are derived from benzyl methacrylate (BzMA) as the monomer.

For the copolymer resins, the chemical composition (% by mole) is shown in Table 1, and the acryloyl group content (% by mole), the acid value (mg KOH/g), and the weight average molecular weight (Mw) as determined using polystyrene as the standard are shown in Table 2.

TABLE 1

| Copolymer resin No. | HEMA | AA | St | BzMA |
|---|---|---|---|---|
| (1) | 18 | 30 | 37 | 15 |
| (2) | 20 | 20 | 35 | 25 |
| (3) | 18 | 30 | 52 | 0 |
| (4) | 18 | 30 | 0 | 52 |

TABLE 2

| Copolymer resin No. | Mw | Content of acryloyl group | Acid value |
|---|---|---|---|
| (1) | 45,000 | 17.0 | 120 |
| (2) | 45,000 | 14.5 | 100 |
| (3) | 45,000 | 14.5 | 120 |
| (4) | 45,000 | 14.5 | 120 |

In the photosensitive resin composition, the content of the photopolymerizable acrylate oligomer and the content of the copolymer resin is generally 5 to 80% by weight, preferably 10 to 50% by weight, on a solid basis. When the content of the oligomer and the content of the copolymer resin are more than 80% by weight, the viscosity of the composition is excessively high, leading to lowered fluidity. This poses a problem of coatability. On the other hand, when the content of the oligomer and the content of the copolymer resin are less than 5% by weight, the viscosity of the composition is excessively low, leading to unsatisfactory stability of a coating of the composition after coating and drying. This poses problems such as deteriorated suitability for exposure and development.

Next, other components constituting the photosensitive resin composition will be described.

Bifunctional or higher polyfunctional polymerizable acrylate monomers and oligomers usable herein include: ethylene oxide (3 mol) adducts, ethylene oxide (6 mol) adducts, propylene oxide (3 mol) adducts, and propylene oxide (6 mol) adducts of dipentaerythritol hexaacrylate (DPHA), dipentaerythritol pentaacrylate (DPPA), pentaerythritol triacrylate (PETTA), trimethylolpropane triacrylate (TMPTA), or trimethylolpropane triacrylate (TMPTA); 1,4-butanediol diacrylate; diethylene glycol diacrylate; and neopentyl glycol diacrylate. The content of the bifunctional or higher polyfunctional polymerizable acrylate monomer in the photosensitive resin composition is generally 3 to 50% by weight, preferably 5 to 20% by weight, on a solid basis. When the bifunctional or higher polyfunctional polymerizable acrylate monomer content is more than 50% by weight, the viscosity of the composition is excessively low, leading to unsatisfactory stability of a coating of the composition after coating and drying. This poses problems such as deteriorated suitability for exposure and development. on the other hand, a bifunctional or higher polyfunctional polymerizable acrylate monomer content of less than 3% by weight poses problems including that unexposed proportions cannot be fully removed in the development.

The epoxy resin functions to react with unreacted acid groups present after exposure and development, thereby imparting alkali resistance to the spacers. Epoxy resins usable herein include o-cresol novolak type, bisphenol A novolak type, phenol novolak type, and bisphenol A type epoxy resins, and cresol novolak type epoxy resins. Examples of phenol novolak type epoxy resins and cresol novolak type epoxy resins include those represented by formulae 6 and 7:

(6)

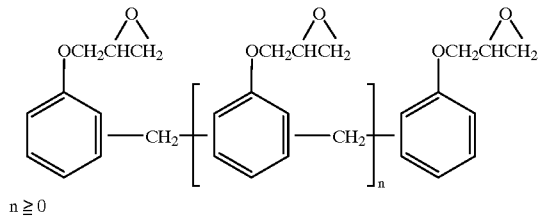

n ≧ 0

(7)

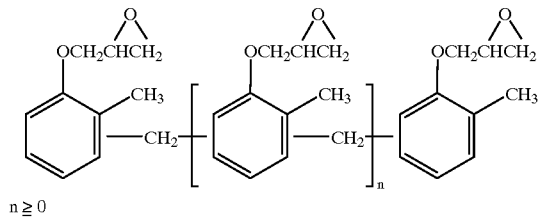

n ≧ 0

The content of the epoxy resin in the photosensitive resin composition is generally 1 to 20% by weight, preferably 3 to 15% by weight, on a solid basis. When the epoxy resin content is less than 1% by weight, satisfactory alkali resistance cannot be imparted to the spacers. On the other hand, when the epoxy resin content is more than 20% by weight, the amount of the epoxy resin not involved in photocuring is excessively large. This unfavorably results in deteriorated storage stability and suitability for development of the photosensitive resin composition. Further, the epoxy resin is effective in removing the tack of the dried coating of the photosensitive resin composition. The addition of the epoxy resin in an amount of about 3% by weight suffices for attaining this effect. The epoxy resin contained in the photosensitive resin composition does not react with acid groups remaining in the spacers even after the exposure and the alkali development. However, heat treatment causes this reaction to impart excellent alkali resistance to the spacers.

Initiators usable herein include 2-methyl-1-[(4-methylthio)phenyl]-2-morpholinopropanone-1,2-benzyl-2-dimethylamino-1-(4-morpholinophenyl)-butanone-1,2,2'-bis(o-chlorophenyl)-4,5,4',5'-tetraphenyl-1,2'-biimidazole, 2,4-diethylthioxanthone, and 4,4'-bisdiethylaminobenzophenone. Examples thereof include Irgacure 184, Irgacure 907, Irgacure 651, and Irgacure 369 (all the above products being tradenames of Ciba Specialty Chemicals, K.K.), and Darocur (tradename, Merck). They may be contained alone or as a mixture of two or more preferably in an amount of 0.1 to 20% by weight, on a solid basis in the photosensitive resin composition.

If necessary, surfactants and silane coupling agents described below may be added to the photosensitive resin composition.

In the photosensitive resin composition, diethylene glycol dimethyl ether, 3-methoxybutyl acetate, propylene glycol monomethyl ether acetate, 3-methyl-3-methoxybutanol and the like may be used as a solvent to give a concentration of 5 to 50% by weight on a solid basis.

In the liquid crystal display device according to the present invention, the photosensitive resin composition is cured to form spacers. In the preparation of liquid crystal cells, sealing is carried at a temperature of 120 to 180° C. (typically 150° C.) under pressure. In this connection, the present inventors have noted that creation of plastic deformation, to such an extent that the desired size of the cell gap cannot be maintained, is unfavorable and the minimized displacement also in the elastically deformable component facilitates the regulation of the cell gap to the target value. This has led to finding that the spacers can be specified by the viscoelasticity thereof.

Specifically, the storage modulus as determined by dynamic viscoelasticity measurement (=elastically deformable component, that is, a component of which the shape can be returned to the original shape) should be not less than the specified value, and the loss tangent (=the proportion of the deformation; the larger this proportion, the larger the amount of the plastically deformable component) should be not more than the specified value. Further, the Young's modulus derived from a stress-strain curve should be not less than the specified value at 150° C.

After the preparation of liquid crystal cells, a reliability test is carried out. When the coefficient of thermal expansion of the resin constituting the spacer is larger than that of the liquid crystal, the cells cannot cope with the thermal expansion of the liquid crystal. In this case, the pressure within the cells becomes lower than the atmospheric pressure, and air enters through the sealed portion, often leading to a foaming phenomenon. Therefore, the properties required of the spacer are those of liquid crystal devices required in the temperature range of −40° C. to 80° C., that is, in such a temperature range that reliability is generally required of the liquid crystal devices.

To this end, the storage modulus as determined by dynamic viscoelasticity measurement (=elastically deformable component, that is, a component of which the shape can be returned to the original shape) should be not more than the specified value in the above temperature range, provided that the storage modulus should be not less than a certain value from the viewpoint of avoiding dynamic instability. Further, the loss tangent (=proportion of the deformation; the larger this proportion, the larger the amount of the plastically deformable component) should be not more than the specified value. Further, the Young's modulus derived from a stress-strain curve should be not more than the specified value at 25° C., provided that the Young's modulus should be not less than a certain value from the viewpoint of avoiding dynamic instability. Further, the dynamic hardness should fall within a certain hardness value range.

According to the first liquid crystal display device of the present invention, the hardness of the photocured resin layer constituting the spacers is specified by dynamic storage modulus, loss modulus, and loss tangent. Specifically, the photocured resin layer should have such properties that, as determined by the measurement of dynamic viscoelasticity in the temperature range of −40° C. to 80° C., the storage modulus (E') is not more than $5.0 \times 10^9$ Pa, preferably $1.0 \times 10^7$ to $2.0 \times 10^9$ Pa, with the loss tangent {tan δ=E" (loss modulus)/E'} being not more than 0.1, preferably not more than 0.02, and, as determined by the measurement of dynamic viscoelasticity in the temperature range of 120° C. to 180° C., the storage modulus (E') is not less than $5.0 \times 10^7$ Pa, preferably not less than $1.0 \times 10^8$ Pa, with the loss tangent {tan δ=E" (loss modulus)/E'} being not more than 0.3, preferably not more than 0.2. The dynamic storage modulus, the loss modulus, and the loss tangent are determined by the following measuring device and method.

Sample: A photosensitive resin composition was coated onto a PET film in its surface. The coating was prebaked at 90° C. for 3 min. The prebaked coating was then pattern-wise exposed to ultraviolet light at 500 mJ/cm$^2$, and dipped for one min in a developing solution composed of a 1 wt % aqueous caustic soda solution to perform development, followed by post-baking at 200° C. for 30 min. Thus, a photocured resin film having a size of 50 μm in thickness, 5 mm in width, and 12 mm in length was prepared.

Device: Solid viscoelastic analyzer RSA-II, manufactured by Rheometrix Corp.

Attachment (mode): Film tension

Frequency: 6.28 rad/sec

Temperature: −50° C. to 250° C. Method: A sample is set in a fixture for a film tensile test.

The temperature dependency at 6.28 rad/sec in the temperature range of −50° C. to 250° C. is measured. The dynamic storage modulus (E', Pa) in the temperature range of −40° C. to 80° C., the dynamic storage modulus (E', Pa) in the temperature range of 120° C. to 180° C. and the dynamic loss modulus (E", Pa) are determined based on the data on the temperature dependency, and dynamic loss modulus (E", Pa)/dynamic storage modulus (E', Pa)=tan δ is then determined.

According to the second liquid crystal display device of the present invention, the modulus of the photocured resin layer constituting the spacers is specified by the Young's modulus derived from a stress-strain curve obtained by the tensile test of the photocured resin film. Specifically, the Young's modulus at 25° C. is not more than 10,000 MPa, preferably 500 to 2000 MPa, and the Young's modulus at 150° C. is not less than 10 MPa, preferably not less than 30 MPa.

Sample: A photosensitive resin composition was coated onto a PET film in its surface. The coating was prebaked at 90° C. for 3 min. The prebaked coating was then pattern-wise exposed to ultraviolet light at 500 mJ/cm$^2$, and dipped for one min in a developing solution composed of a 1 wt % aqueous caustic soda solution to perform development, followed by post-baking at 200° C. for 30 min. Thus, a photocured resin film having a size of 50 μm in thickness, 5 mm in width, and 12 mm in length was prepared.

The Young's modulus at 25° C. is determined by the following measuring device and method.

Device: Tensilon Universal Tester RTA-100, manufactured by ORIENTEC

Mode: Film tensile test

Temperature: 25° C.

Measuring method: A sample is set in a fixture for a film tensile test, and the tensile modulus in the vertical direction is then measured.

The Young's modulus at 150° C. is determined by the following measuring device and method.

Device: Solid viscoelastic analyzer RSA-II, manufactured by Rheometrix Corp.

Mode: STRAIN RATE SWEEP

Temperature: 150° C.

Method: A sample is set in a fixture for a film tensile test, and the tensile modulus in the vertical direction is then measured.

According to the third liquid crystal display device of the present invention, the modulus of the photocured resin layer constituting the spacers is specified by dynamic hardness (DH). In order to determine the dynamic hardness (DH), an indentation test is carried out by a dynamic microhardness tester using a triangular pyramid indenter to measure displacement depth at the time of loading (D1) and displacement depth at the time of unloading (D2), and the dynamic hardness (DH) is then calculated by the following equation:

$$DH = 3.8584 \times P/(D \times D)$$

wherein D1, D2: displacement depth, μm; and

P: load, gf.

The dynamic hardness is characterized in that the dynamic hardness at the time of loading (DH1) is 30 to 60, preferably 40 to 50. For the determination of the dynamic hardness, the following measuring device and method are adopted.

Sample: A photosensitive resin composition was coated onto a glass in its surface. The coating was prebaked at 90° C. for 3 min. The prebaked coating was then pattern-wise exposed to ultraviolet light at 500 mJ/cm$^2$, and dipped for one min in a developing solution composed of a 1 wt % aqueous caustic soda solution to perform development, followed by post-baking at 200° C. for 30 min. Thus, a photocured resin film having a thickness of 5 μm was prepared.

Device: Dynamic microhardness meter DUH-201S, manufactured by Shimadzu Seisakusho Ltd.

Attachment: Triangular pyramid indenter, 115° C.

Method: A load is increased to the following set value at the following rate. The load is then held for the following holding time, followed by unloading to determine the indentation displacement depth at the time of loading (D1) and the displacement depth at the time of unloading (D2).

Set load: 29.4 mN (=3 gf)

Loading rate: 0.132390 mN/sec

Holding time: 10 sec

Based on the results of the measurement, the dynamic hardness at the time of loading (DH1) and the dynamic hardness at the time of unloading (DH2) are determined by the above equation. Large dynamic hardness at the time of loading (DH1) means small indentation displacement depth D, indicating that elastic portion including the plastically deformable portion has high hardness. The dynamic hardness at the time of unloading (DH2) is a value indicating the degree of the plastic deformation, and complete return gives an infinity. Therefore, the larger the DH2 value, the smaller the degree of the plastic deformation. This permits the ratio of the plastically deformable component to the elastically deformable component can be expressed by DH2/DH1. The formation of the spacer coating having the lowest possible DH2/DH1 value is preferred from the viewpoint of the object of the present invention.

According to the liquid crystal display device of the present invention, specifying the spacer by the viscoelasticity as described above leads to advantages including that the deformation of the spacer in the step of cell assembling is small, can maintain a desired cell gap, and the difference in the coefficient of thermal expansion between the liquid crystal and the resin constituting the spacers can be absorbed also by the viscoelasticity of the spacers to suppress the foaming phenomenon at low temperatures.

Next, the liquid crystal display device will be described in more detail. FIG. 1 is a partial cross-sectional view showing one embodiment of the liquid crystal display device having a color filter provided with spacers. A liquid crystal display device 1 comprises a color filter 2 and an opposed substrate 3, such as TFT, which is disposed so as to face the color filter 2. The color filter 2 comprises: a glass substrate 4; a black matrix 5 provided on the glass substrate 4, the black matrix 5 being formed of a metal, such as chromium, or an oxide thereof or formed of a resin black matrix comprising a resin and a light-shielding agent; and colored layers 6 formed of three primary colors of R (red), G (green), and B (blue) with a black matrix 5 being used as the boundary.

A protective layer 7 formed of a transparent synthetic resin is provided on the colored layers, and a transparent electrode layer 8 formed of ITO or the like is provided on the protective layer 7. Spacers 9 formed of a photocured resin layer are provided on the transparent electrode layer 8. An aligning film 12 is provided on the color filter and the opposed substrate in their surface in contact with a liquid crystal. The color filter and the opposed substrate are joined to each other by means of a sealant 10, such as an epoxy resin. A liquid crystal 11 is filled into between the color filter and the opposed substrate.

Figure 2:
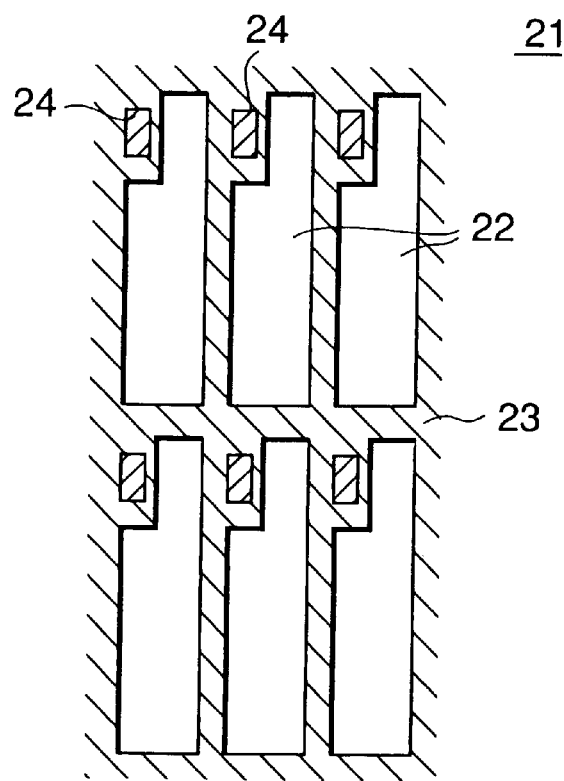
FIG. 2 is a plan view showing one embodiment of a color filter with spacers formed thereon.

FIG. 2 is a plan view showing color pixels constituting a part of the color filter. Color pixels 22 in the color filter 21 are partitioned by a black matrix 23. Spacers 24 may be provided in portions, which are not effective for display, present around the color pixels. The size of the color pixel may vary according to the size of the screen and the standards of image quality. The size, however, is generally as small as about several 10 $\mu$m to several 100 $\mu$m×several 10 $\mu$m to several 100 $\mu$m, for example, about 100 $\mu$m×300 $\mu$m. In some cases, regions for making elements provided, for example, on the opposed TFT substrate invisible from the display surface are provided on a part of the color pixels. The provision of spacers in such regions is not any obstacle to display.

Figure 3A:
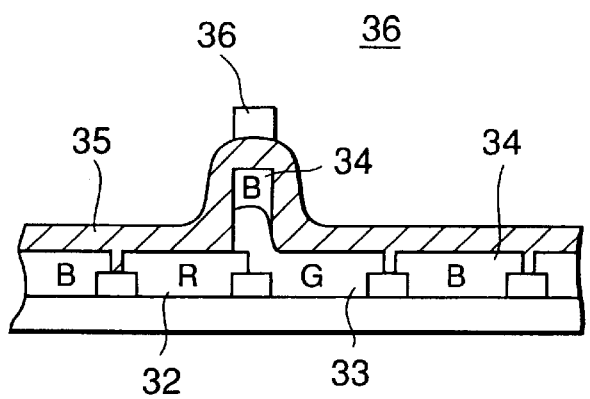
FIGS. 3A to 3C are cross-sectional view showing another embodiment of a color filter with spacers formed thereon.
Figure 3B:
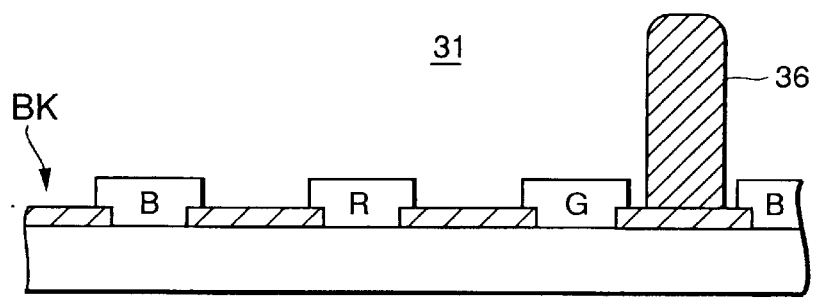
Figure 3C:
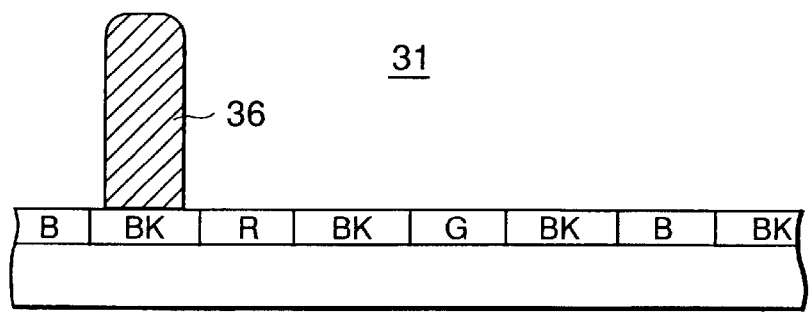
Figure 4:
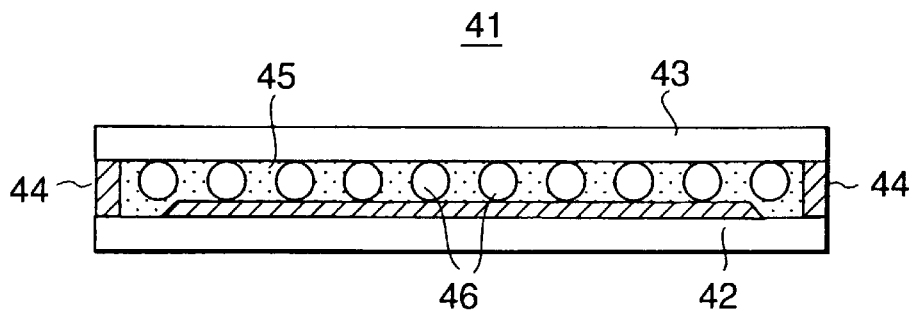
FIG. 4 is a cross-sectional view of a conventional liquid crystal display device.

FIGS. 3A to 3C show spacer formation processes utilizing a colored layer in a color filter. In the process shown in FIG. 3A, color pixels formed of three colors of red, green, and blue constituting a colored layer may be first formed on the substrate for the color filter 31 as follows. As shown in the drawing, a first color pixel 32, a red color pixel, is formed, and a second color pixel 33, a green color pixel, is formed by exposure using a photomask that provides a green pixel which partially covers the red color pixel. Next, a third color pixel 34, a blue color pixel, is formed also on spacer-forming portions by using a photomask for a blue color pixel which provides a blue color pixel also on the spacer-forming portions. A transparent electrode layer 35, such as an ITO layer, is then formed. Finally, spacers 36 may be formed. According to this formation process, since the height of the spacer can be ensured by stacking color pixels on top of one another, the height of the spacer formed on the transparent electrode layer may be small.

In the formation process shown in FIG. 3B, black masks Bk are first formed by using chromium on a substrate for a color filter 31. Color pixels B, G, and R are then formed in such a manner that the color pixels partially overlap the black masks Bk. Spacers 36 are formed between pixels. According to the formation process shown in FIG. 3C, black masks Bk formed of a resin are formed together with color pixels B, G, and R on the substrate for the color filter 31, and spacers 36 are formed on the black masks Bk. In FIGS. 3B and 3C, the transparent electrode layer is not shown.

The spacer may be disposed in a proper density, such as a density of one spacer per four pixels or one spacer per one pixel. The spacer density in terms of volume density is generally 0.1 to 5%, preferably 0.3 to 2%, from the viewpoint of the function of the spacer. When the volume density of the spacer exceeds the upper limit of the above density range, the pouring efficiency in the step of pouring a liquid crystal is unfavorably lowered. On the other hand, a smaller volume density than the lower limit of the above volume density range is causative of the deformation of the spacer at the time of cell assembling. The surface area density of the spacer is generally 50 to 2,000 $\mu m^2/mm^2$, preferably 500 to 1,000 $\mu m^2/mm^2$. A surface area density smaller than the lower limit of the above surface area density range is causative of the deformation of the spacer at the time of cell assembling, while when the surface area density exceeds the above surface area density range, the pouring efficiency in the step of pouring the liquid crystal is unfavorably lowered.

The shape of the spacer formed by development may be, for example, a trapezoid having a height of 2 to 10 $\mu$m, and the edge of the spacer may be in a round spherical form or an angular rectangular form. However, the spherical form is effective from the viewpoint of reducing the influence on orientation or the like in the step of rubbing after the formation of an aligning film.

When one spacer is provided for each size of 100 $\mu$m×300 $\mu$m in color pixel, about 33 spacers can be formed in 1 $mm^2$. This value is smaller than 100 spacers/$mm^2$, the number of spacers per $mm^2$ in the case of the conventional technique where spacers are mixed with a liquid crystal. Since, however, the spacers are homogeneously arranged over the whole display surface, the above number of spacers suffice for attaining the contemplated object.

In conventional spacer spreading, it is very difficult to control the spreading position. By contrast, the liquid crystal display device of the present invention can be prepared in such a state that spacers having a desired size are fixed on desired positions, so that image quality and the like are excellent.

The formation of spacers on black matrixes partitioning the colored layers does not influence the display quality and hence is preferred. The spacers are preferably formed of a photocured transparent resin layer. The spacers, however, are not limited to the transparent resin layer, and may also be a colored photocured resin layer.

A production process of the liquid crystal display device shown in FIG. 1 will be described.

A colored layer is first provided on a transparent substrate. A photosensitive resin composition is then coated onto the colored layer by any coating method, such as spin coating, roll coating, spray coating, or screen printing. Ultraviolet light is then applied with a predetermined photomask provided on the coating, thereby curing necessary portions. The photocurable resin in its portions remaining uncured due to unexposure to the ultraviolet light is dissolved in and removed by an aqueous alkali solution as a solvent to form a protective layer.

An ITO layer having electric resistance and other excellent properties is formed by DC magnetron sputtering onto the protective layer over the whole surface of the color filter.

The photosensitive resin composition of the present invention is then coated onto the ITO layer by any coating method, such as spin coating, roll coating, spray coating, or screen printing, to a thickness corresponding to the sandwich/support distance of the liquid crystal layer. A predetermined photomask is provided on the coating, followed by ultraviolet irradiation to cure spacer-forming portions. The photosensitive resin composition coating in its uncured portions, that is, portions unexposed to ultraviolet light, are dissolved in and removed by an aqueous alkali solution as a solvent. Thus, spacers are formed.

Prior to the provision of the photocured resin layer for spacers, a silane coupling agent or the like ay be coated onto the ITO layer to enhance the adhesion.

Silane coupling agents usable herein include, for example, vinylsilane, acrylsilane, epoxysilane, and aminosilane. More specifically, examples of vinylsilanes usable herein include vinyltrichlorosilane, vinyltris(β-methoxyethoxy)silane, vinyltriethoxysilane, and vinyltrimethoxysilane. Examples of acrylsilanes usable herein include γ-methacryloxypropyltrimethoxysilane, and γ-methacryloxypropylmethyldimethoxysilane. Examples of epoxysilanes usable herein include β-(3,4-epoxycyclohexyl) ethyltrimethoxysilane, γ-glycidoxypropyltrimethoxysilane, and γ-glycidoxypropylmethyldiethoxysilane. Examples of aminosilanes usable herein include N-β-(aminoethyl)-γ-aminopropyltrimethoxysilane, N-β-(aminoethyl)-γ-aminopropylmethylditrimethoxysilane, γ-aminopropyltriethoxysilane, and N-phenyl-γ-aminopropyltrimethoxysilane. Examples of other silane coupling agents usable herein include γ-mercaptopropyltrimethoxysilane, γ-chloropropyltrimethoxysilane, γ-chloropropyl-methyldimethoxysilane, γ-chloropropylmethyldimethoxysiliane, and γ-chloropropylmethyldiethoxysilane.

In addition to the liquid crystal display device shown in FIG. 1, the liquid crystal display device may be constructed such that, after the formation of a colored layer and a protective layer on a transparent substrate in the same manner as used in the preparation of the liquid crystal display device shown in FIG. 1, spacers may be formed on the protective layer followed by the formation of an ITO layer in a region including the spacers to prepare a liquid crystal display device.

In this case, the formation of the protective layer using the same material as used in the formation of the photocured resin layer according to the present invention enables the formation of spacers having high strength of adhesion between the spacer and the protective layer as the substrate layer. According to this embodiment, the ITO layer is formed also on the spacers, leading to electrically conductive connections between the spacer and the counter electrode. The electrically conductive connection between the spacer and the counter electrode may be avoided by previously masking the top of the spacers to prevent the ITO layer from being formed on the spacers, by providing short-circuit preventing means on the opposed electrode side, or by removing the formed ITO layer from the surface of the spacers by etching.

All the above liquid crystal display devices have a protective layer. Alternatively, the liquid crystal display device may have such a construction that, after a colored layer is formed on a transparent substrate in the same manner as used in the preparation of the liquid crystal display device shown in FIG. 1, an ITO layer is formed directly on the colored layer followed by the formation of spacers on the ITO layers.

Further, as described in working examples below, the liquid crystal display device has such a construction that, after the formation of a colored layer on a transparent substrate in the same manner as used in the preparation of the liquid crystal display device shown in FIG. 1, spacers are formed on the colored layer followed by the formation of an ITO layer in a region including the spacers to prepare a liquid crystal display device.

All the above liquid crystal display devices have spacers on the color filter side. Alternatively, spacers may be formed on the opposed TFT substrate, followed by cell assembling using the TFT substrate having thereon spacers and a color filter formed in the same manner as described above.

According to the present invention, in the liquid crystal display device, spacers capable of supporting both the substrates while leaving a predetermined gap therebetween and provided on at least one of the substrates. This eliminates the need to disperse spacer particles or the like in the liquid crystal.

The following examples further illustrate the present invention. Copolymer resin (1) used in Example 1 was synthesized as follows.
(synthesis of copolymer resin (1))
The following composition was provided.

| Benzyl methacrylate | 264 g | (15 mol %) |
| Styrene | 385 g | (37 mol %) |
| Acrylic acid | 216 g | (30 mol %) |
| 2-Hydroxyethyl methacrylate | 234 g | (18 mol %) |

This composition, together with 5 g of azobisisobutyronitrile, was dissolved in 650 g of 3-methoxybutyl acetate. The solution was then added dropwise to a polymerizer containing 1000 g of 3-methoxybutyl acetate at 100° C. over a period of 6 hr. Thus, polymerization was carried out to prepare a polymer solution.

The polymer solution had a solid content of 40% by weight and a viscosity of 1050 mPa·s (30° C., Brookfield viscometer). The polymer had an acid value of 152 mg KOH/g, a hydroxyl value of 90 mg KOH/g, and a weight average molecular weight of 37,000 as determined using polystyrene as a standard.

The copolymer thus obtained comprised 15% by mole of styrene units, 37% by mole of benzyl methacrylate units, 30% by mole of acrylic acid units, and 18% by mole of 2-hydroxyethyl methacrylate units.

A mixture having the following composition was added dropwise to the polymer solution over a period of 5 hr.

| 2-Methacryloylethyl isocyanate | 270 g |
|---|---|
| Dibutyltin laurate | 1 g |
| 3-Methoxybutyl acetate | 2230 g |

The progress of the reaction was monitored by IR (an infrared absorption spectrum), and the reaction was continued until the peak attributable to the isocyanate group at 2200 cm$^{-1}$ had disappeared.

The reaction solution thus obtained had a solid content of 26% by weight and a viscosity of 500 mPa·s (30° C., Brookfield viscometer). The polymer had an acid value of 120 mg KOH/g, a hydroxyl value of 5 mg KOH/g, and a weight average molecular weight of 45,000 as determined using polystyrene as a standard and contained 17% by mole of (meth)acryloyl groups.

EXAMPLE 1

A black matrix of metallic chromium having a thickness of 100 nm, a percentage opening of 50%, and each pixel size of 20 μm×40 μm was formed by sputtering on a 1.1 mm-thick glass substrate (an AL material, manufactured by Asahi Glass Co., Ltd.).

A red photosensitive resin having the following composition was spin coated thereon to a coating thickness of 1.5 μm. The coated substrate was dried for 30 min in an oven of 70° C. Next, The coated surface was exposed to light from a mercury lamp through a photomask having a predetermined pattern, followed by spray development with water for one min to form a red relief pattern in regions where red pixels are to be formed. Thereafter, heat curing treatment was carried out at 150° C. for 30 min.

Next, the same procedure as used in the formation of the red relief pattern was repeated, except that a green photosensitive resin having the following composition was used. Thus, a green relief pattern was formed in regions where green pixels are to be formed.

The same procedure as used in the formation of the red relief pattern was then repeated, except that a blue photosensitive resin having the following composition was used. Thus, a blue relief pattern was formed in regions where blue pixels are to be formed. Thus, colored layers of three colors, red (R), green (G), and blue (B), were prepared.

| (Composition of red photosensitive resin) | |
|---|---|
| Pyrazolone Red (red pigment) | 10 pts. wt. |
| Polyvinyl alcohol/5% stilbazolium quinolium (photosensitive resin) | 5 pts. wt. |
| Water | 85 pts. wt. |
| (Composition of green photosensitive resin) | |
| Lionol Green 2Y-301 (green pigment) | 9 pts. wt. |
| Polyvinyl alcohol/5% stilbazolium quinolium (photosensitive resin) | 5 pts. wt. |
| Water | 86 pts. wt. |
| (Composition of blue photosensitive resin) | |
| Fastogen Blue (blue pigment) | 3 pts. wt. |
| Polyvinyl alcohol/5% stilbazolium quinolium (photosensitive resin) | 5 pts. wt. |
| Water | 92 pts. wt. |

A photosensitive resin composition having the following formulation for spacers was spin coated onto the glass substrate, with the colored layers formed thereon, to a coating thickness of 5.0 μm on a dry basis.

(Preparation of photosensitive resin composition)
The following compounds were provided.

| Copolymer resin (1) (solid content 26 wt %) | 45.7 pts. wt. |
|---|---|
| Dipentaerythritol pentaacrylate (SR 399, manufactured by Sartomer) | 9.1 pts. wt. |
| o-Cresol novolak type epoxy resin (Epikote 180S70, manufactured by Yuka Shell Epoxy K.K.) | 5.2 pts. wt. |
| 2-Benzyl-2-N,N-dimethylamino-1-(4-morpholinophenyl)-1-butanone | 1.3 pts. wt. |
| 2,2'-Bis(o-chlorophenyl)-4,5,4',5'-tetraphenyl-1,2'-biimidazole | 1.0 pts. wt. |
| Polyoxyethylene octyl phenyl ether (Nonion HS-210, manufactured by Nippon Oils & Fats Co., Ltd.) | 1.9 pts. wt. |
| Diethylene glycol dimethyl ether | 24.8 pts. wt. |
| 3-Methoxybutyl acetate | 12.9 pts. wt. |

They were mixed together at room temperature with stirring to prepare the photosensitive resin composition.

(Step of exposure and development)

A photomask designed so as to provide spacers having desired shape, size and intervals was disposed at a position 100 μm distant from the coating of the photosensitive resin composition. Ultraviolet light was applied by a proximity aligner from a 2.0 kW ultrahigh-pressure mercury lamp for 10 sec only to spacer-forming regions on the black matrix. The exposed assembly was then immersed in a 0.05% aqueous potassium hydroxide solution (liquid temperature 23° C.) for one min to perform alkali development. Thus, only uncured portions in the coating of the photosensitive resin composition were removed.

Thereafter, the assembly was allowed to stand in an atmosphere of 180° C. for 30 min to perform heat treatment, thereby forming fixed spacers. Thus, a color filter was obtained.

A transparent electrode layer was formed on the color filter in its surface including the fixed spacers by DC magnetron sputtering using ITO as a target and argon and oxygen as discharge gases at a substrate temperature of 200° C.

Cell assembling was then carried out by joining the resultant assembly to a glass substrate, which had been treated in such a manner that an aligning film of a polyimide was formed on the glass substrate followed by the formation of TFT using an epoxy resin as a sealant, under conditions of temperature 150° C. and pressure 0.3 kg/cm$^2$. A TN liquid crystal was then filled into the cells to prepare a liquid crystal display device according to the present invention.

EXAMPLE 2

Colored layers were formed on a glass substrate in the same manner as in Example 1. A transparent electrode layer was then formed on the colored layers by DC magnetron sputtering using ITO as a target and argon and oxygen as discharge gases at a substrate temperature of 200° C.

Spacers were then formed on the transparent electrode layer in the same manner as in Example 1, followed by the formation of an aligning film of a polyimide. Cell assembling was then carried out by joining the resultant assembly to a glass substrate, which had been treated in such a manner that TFT was formed using an epoxy resin as a sealant, under conditions of temperature 150° C. and pressure 0.3 kg/cm$^2$. A TN liquid crystal was then filled into the cells to prepare a liquid crystal display device according to the present invention.

EXAMPLE 3

The following ingredients were mixed together at room temperature with stirring to prepare a photosensitive resin composition.

| | |
|---|---|
| o-Cresol novolak acrylate | 25 pts. wt. |
| Aronix M-400 (DPHA: manufactured by Toa Gosei Chemical Industry Co., Ltd. | 11 pts. wt. |
| o-Cresol novolak type epoxy resin (Epikote 154, NV 70%, manufactured by Yuka Shell Epoxy K.K.) | 4 pts. wt. |
| 2-Methyl-1-[(4-methylthio)phenyl]-2-morpholinopropanone-1 | 1 pts. wt. |
| 3-Methoxybutyl acetate | 58 pts. wt. |
| Silicon KBM 403 (a silane coupling agent) | 1 pts. wt. |

A liquid crystal display device was prepared in the same manner as in Example 1, except that the photosensitive resin composition prepared just above was used instead of the photosensitive resin composition in Example 1.

Comparative Example

The following ingredients were mixed together at room temperature with stirring to prepare a photosensitive resin composition.

| | |
|---|---|
| Alkali-soluble binder (a copolymer composed mainly of benzyl methacrylate, styrene, and acrylic acid; molecular weight 3000) | 30 pts. wt. |
| Dipentaerythritol pentaacrylate (SR 399, manufactured by Sartomer) | 20 pts. wt. |
| o-Cresol novolak type epoxy resin (Epikote 180S70, manufactured by Yuka Shell Epoxy K.K.) | 5 pts. wt. |
| 2-Methyl-1-[(4-methylthio)phenyl]-2-morpholinopropanone-1 | 3 pts. wt. |
| Diethylene glycol dimethyl ether | 30 pts. wt. |
| 3-Methoxybutyl acetate | 12 pts. wt. |

A liquid crystal display device was prepared in the same manner as in Example 1, except that the photosensitive resin composition prepared just above was used instead of the photosensitive resin composition in Example 1.

For the photosensitive resin compositions used in Examples 1 to 3 and Comparative Example, photocured resin films were prepared as test samples for the measurement of dynamic storage modulus, loss modulus, and loss tangent, followed by dynamic storage modulus, loss modulus, and loss tangent measurements in the same manner as described above. The results of the measurement on the photosensitive resin compositions used in Examples 1 and 2 are shown in FIG. 5, the results of the measurement on the photosensitive resin composition used in Example 3 are shown in FIG. 6, and the results of the measurement on the photosensitive resin composition used in Comparative Example are shown in FIG. 7.

Figure 5:
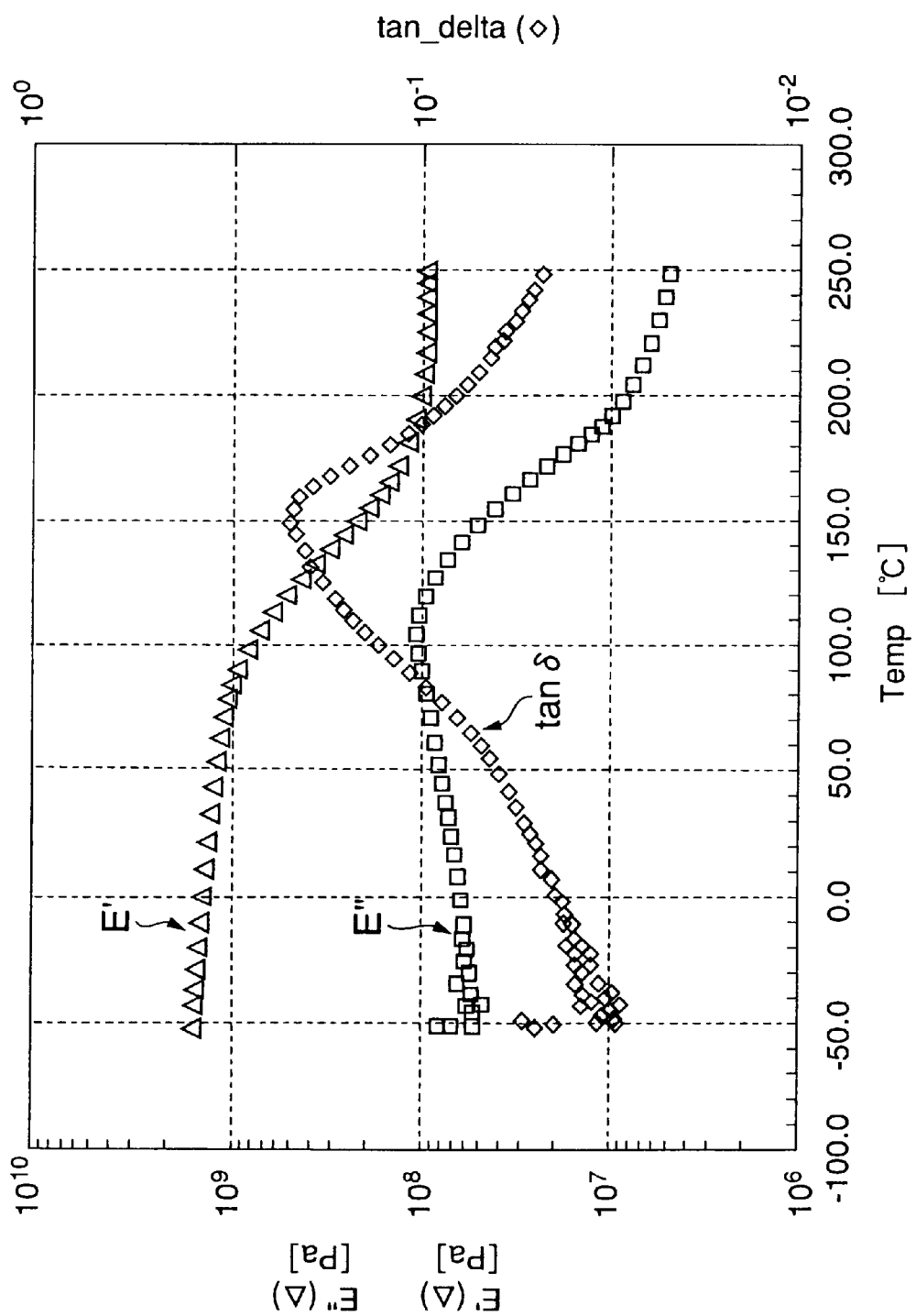
FIG. 5 is a graph showing the results of dynamic storage modulus, loss modulus, and loss tangent measurements on a photosensitive resin composition used in Examples 1 and 2.

As is apparent from FIG. 5, for the photocured resin films as test samples formed from the photosensitive resin compositions used in Examples 1 and 2, as determined by the measurement of dynamic viscoelasticity in the temperature range of $-40°$ C. to $80°$ C., the storage modulus (E') was $1.0 \times 10^9$ to $5.0 \times 10^9$ Pa with the loss tangent {tan $\delta$=E" (loss modulus)/E'} being 0.01 to 0.1 and, as determined by the measurement of dynamic viscoelasticity in the temperature range of $120°$ C. to $180°$ C., the storage modulus (E') was $5.0 \times 10^7$ to $1.0 \times 10^9$ Pa with the loss tangent {tan $\delta$=E" (loss modulus)/E'} being 0.1 to 0.3.

Figure 6:
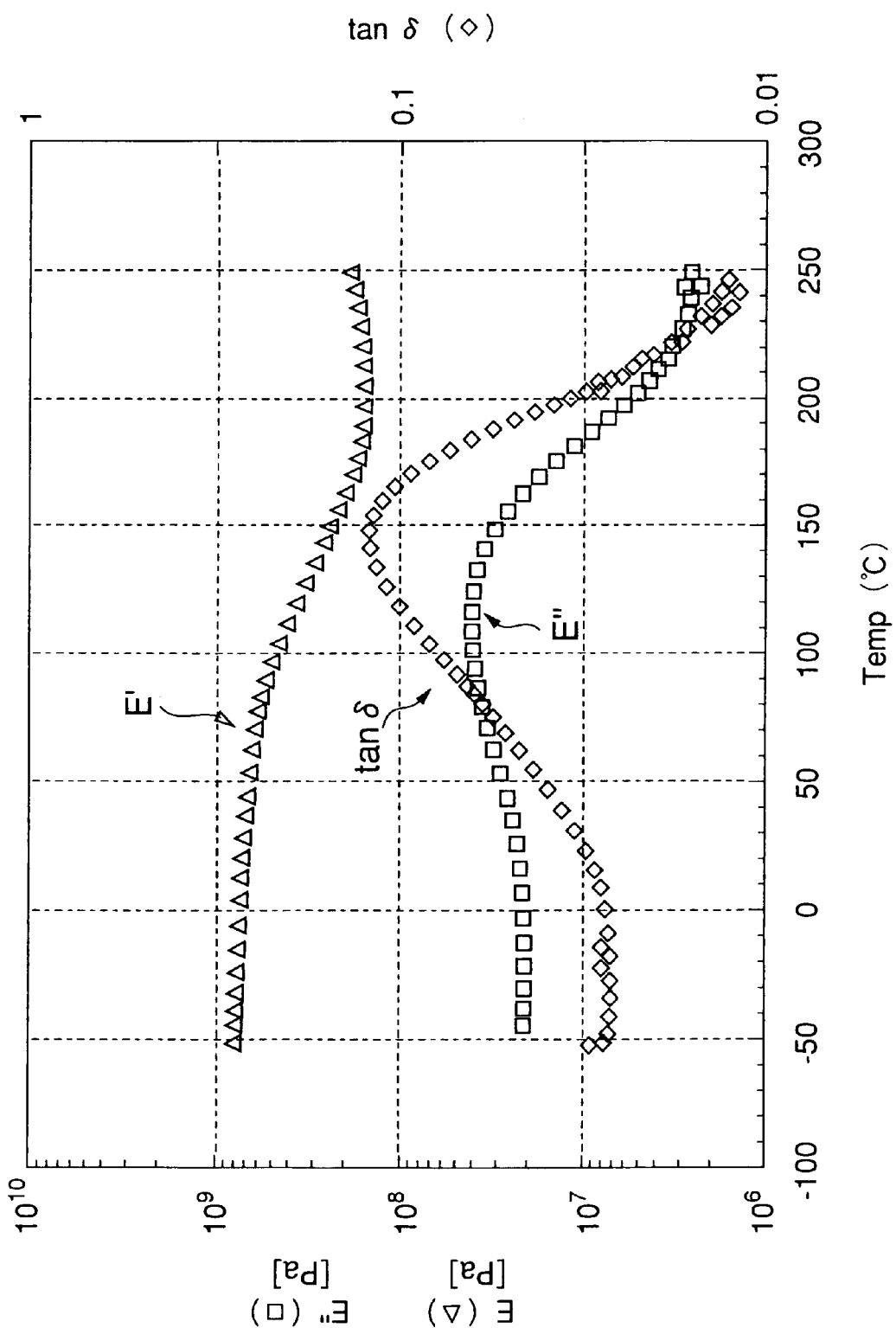
FIG. 6 is a graph showing the results of dynamic storage modulus, loss modulus, and loss tangent measurements on a photosensitive resin composition used in Example 3.

Further, as is apparent from FIG. 6, for the photocured resin film as a test sample formed from the photosensitive resin composition used in Example 3, as determined by the measurement of dynamic viscoelasticity in the temperature range of $-40°$ C. to $80°$ C., the storage modulus (E') was $5.0 \times 10^8$ to $1.0 \times 10^9$ Pa with the loss tangent {tan $\delta$=E" (loss modulus)/E'} being 0.02 to 0.08 and, as determined by the measurement of dynamic viscoelasticity in the temperature range of $120°$ C. to $180°$ C., the storage modulus (E') was $1.0 \times 10^8$ to $1.0 \times 10^9$ Pa with the loss tangent {tan $\delta$=E" (loss modulus)/E'} being 0.08 to 0.1.

Figure 7:
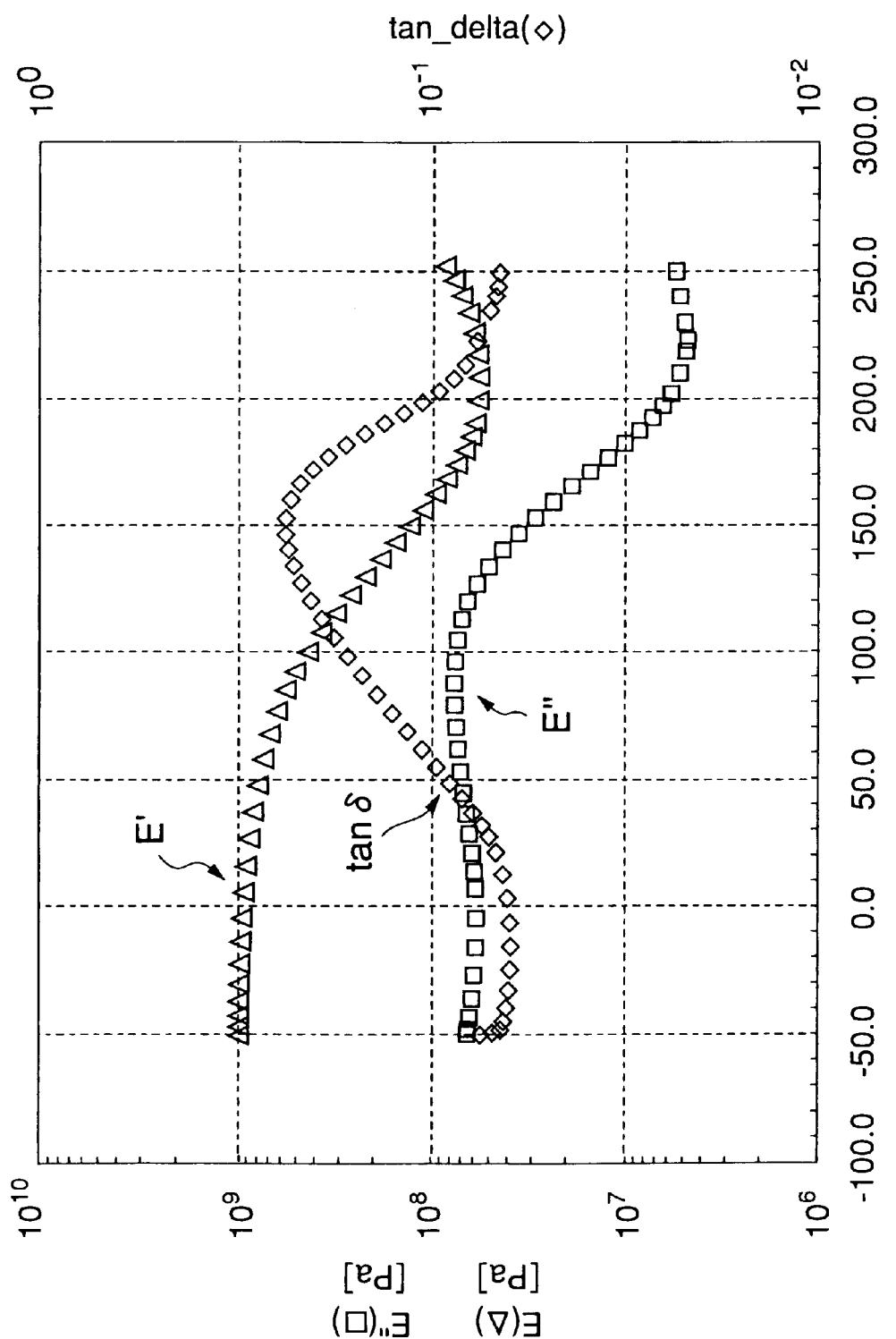
FIG. 7 is a graph showing the results of dynamic storage modulus, loss modulus, and loss tangent measurements on a photosensitive resin composition used in Comparative Example.

On the other hand, as is apparent from FIG. 7, for the photocured resin film as a test sample formed from the photosensitive resin composition used in Comparative Example, as determined by the measurement of dynamic viscoelasticity in the temperature range of $-40°$ C. to $80°$ C., the storage modulus (E') was $5.0 \times 10^8$ to $1.0 \times 10^9$ Pa with the loss tangent {tan $\delta$=E" (loss modulus)/E'} being 0.05 to 0.15 and, as determined by the measurement of dynamic viscoelasticity in the temperature range of $120°$ C. to $180°$ C., the storage modulus (E') was $1.0 \times 10^8$ to $1.0 \times 10^9$ Pa with the loss tangent {tan $\delta$=E" (loss modulus)/E'} being 0.1 to 0.3.

That is, the photocured resin film as the test sample prepared from the photosensitive resin composition used in Comparative Example is different from the photocured resin films as test samples formed from the photosensitive resin compositions used in Examples 1 and 2 in loss tangent in the temperature range of $-40°$ C. to $80°$ C.

For the photosensitive resin compositions used in Examples 1 to 3 and Comparative Example, photocured resin films were prepared as test samples for the measurement of Young's modulus, followed by the measurement of Young's modulus (MPa) at 1% strain derived from a stress-strain curve obtained by a tensile test of the test samples in the same manner as described above. The results are shown in Table 3 below.

TABLE 3

| Measuring temp. | Exs. 1 and 2 | Ex. 3 | Comp. Ex. |
|---|---|---|---|
| 25° C. | 940 | 840 | 640 |
| 150° C. | 43 | 170 | 8 |

As is apparent from Table 3, for the photocured resin films as test samples prepared from the photosensitive resin compositions used in Examples 1 to 3, the Young's modulus (MPa) at 25° C. was in the Young's modulus range specified in the present invention, that is, not more than 10,000 and the Young's modulus (MPa) at 150° C. was also in the Young's modulus range specified in the present invention, that is, not less than 10 MPa, whereas for the photocured resin film as a test sample prepared from the photosensitive resin composition used in Comparative Example was outside the scope of the present invention with respect to the Young's modulus (MPa) at 150° C.

For the photosensitive resin compositions used in Examples 1 to 3 and Comparative Example, photocured resin films were prepared as test samples for the measurement of dynamic hardness, followed by the measurement of dynamic hardness in the same manner as described above. The results are shown in Table 4 below.

TABLE 4

| Measuring temp. | Exs. 1 and 2 | Ex. 3 | Comp. Ex. |
|---|---|---|---|
| 25° C. | 43.0 | 33.9 | 28.0 |

As is apparent from Table 4, for the photocured resin films as test samples prepared from the photosensitive resin compositions used in Examples 1 to 3, the dynamic hardness at 25° C. was in the dynamic hardness range specified in the present invention, that is, 30 to 60, whereas for the photocured resin film as a test sample prepared from the photosensitive resin composition used in Comparative Example was outside the dynamic hardness range specified in the present invention.

Next, for the liquid crystal display devices prepared in Examples 1 to 3 and Comparative Example, the size of the fixed spacers was measured by observation under a microscope.

For the liquid crystal display devices prepared in Examples 1 to 3, it was observed that one spacer per four pixels was formed on the black matrix and that the spacers were in a trapezoid form wherein the size of the upper base was 100 $\mu m^2$ with the size of the lower base being 10 $\mu m$ larger than the upper base. The formation of the 5 $\mu m$-thick coating provided fixed spacers having a desired thickness of 4.7 $\mu m$ in the final liquid crystal display device. By contrast, for Comparative Example, the fixed spacers in the final liquid crystal display device had a thickness of 4.3 $\mu m$, that is, did not have desired thickness, and had a collapsed shape.

The liquid crystal display devices prepared in Examples 1 to 3 and Comparative Examples were evaluated for the resistance to low-temperature foaming by cooling the devices at a temperature of −30 to −40° C. for several days. As a result, the liquid crystal display devices prepared in Examples 1 to 3 did not cause any change. On the other hand, the comparative liquid crystal display device created small foams which scattered here and there in the liquid crystal layer.

Further, for the liquid crystal display devices prepared in Examples 1 to 3 and Comparative Example, a liquid crystal was filled into the cells, followed by annealing at 100 to 120° C. As a result, the liquid crystal display devices prepared in Examples 1 to 3 remained unchanged, whereas the liquid crystal display device prepared in Comparative Example suffered from lowered contrast.

Further, for the liquid crystal display devices prepared in Examples 1 to 3 and Comparative Example, a thermal shock test was carried in such a manner that 100 cycles, per day, each consisting of −30° C.→room temperature→+80° C. were repeated. As a result, the liquid crystal display devices prepared in Examples 1 to 3 remained unchanged, whereas the liquid crystal display device prepared in Comparative Example suffered from lowered contrast and foaming.

As is apparent from the foregoing description, the liquid crystal display devices according to the present invention can assure a desired cell gap at the time of heat contact bonding involved in the assembling of cells in a liquid crystal display device and, after the preparation of liquid crystal cells, has excellent reliability, can cope with an increase in cell thickness at high temperatures, and can inhibit a foaming phenomenon in a liquid crystal layer at low temperatures.

What is claimed is:

1. A liquid crystal display device comprising: two substrates; a liquid crystal sandwiched and supported between the two substrates; and spacers, for maintaining a predetermined substrate-substrate spacing, provided on at least one of the substrates in its portion where the liquid crystal is sandwiched and supported, the spacers comprising a photocured resin layer, the photocured resin layer having such properties that, as determined by the measurement of dynamic viscoelasticity in the temperature range of −40° C. to 80° C., the storage modulus (E') is not more than $5.0 \times 10^9$ Pa with the loss tangent {tan δ=E" (loss modulus)/E'} being not more than 0.1 and, as determined by the measurement of dynamic viscoelasticity in the temperature range of 120° C. to 180° C., the storage modulus (E') is not less than $5.0 \times 10^7$ Pa with the loss tangent {tan δ=E" (loss modulus)/E'} being not more than 0.3.

2. A liquid crystal display device comprising: two substrates; a liquid crystal sandwiched and supported between the two substrates; and spacers, for maintaining a predetermined substrate-substrate spacing, provided on at least one of the substrates in its portion where the liquid crystal is sandwiched and supported, the spacers comprising a photocured resin layer, the photocured resin layer having a Young's modulus, derived from a stress-strain curve, of not more than 10,000 MPa at 25° C. and not less than 10 MPa at 150° C.

3. A liquid crystal display device comprising: two substrates; a liquid crystal sandwiched and supported between the two substrates; and spacers, for maintaining a predetermined substrate-substrate spacing, provided on at least one of the substrates in its portion where the liquid crystal is sandwiched and supported, the spacers comprising a photocured resin layer, the photocured resin layer having a dynamic hardness of 30 to 60 under load.

4. The liquid crystal display device according to claim 1, wherein said photocured resin layer is a cured layer which has been formed from a photocurable resin composition, the photocurable resin composition comprising: a copolymer resin; a bifunctional or higher polyfunctional photopolymerizable acrylate monomer or oligomer; an epoxy resin; and an initiator, said copolymer resin comprising 5 to 55% by mole of constituent units represented by formula (1) and 5 to 95% by mole of constituent units represented by formula (2), the constituent units represented by formula (1) having been partially reacted, through carboxyl groups thereof, with a (meth)acryloylalkyl isocyanate compound, the constituent units represented by formula (2) having been partially reacted, through hydroxyl groups thereof, with a (meth)acryloylalkyl isocyanate compound, said copolymer resin containing 5 to 95% by mole of (meth)acryloyl groups and having an acid value of 5 to 400 mg KOH/g and a weight average molecular weight of 10,000 to 1,000,000 as determined using polystyrene as a standard:

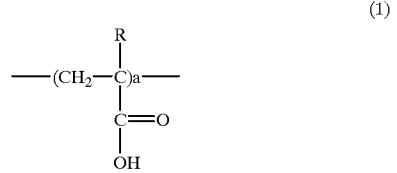

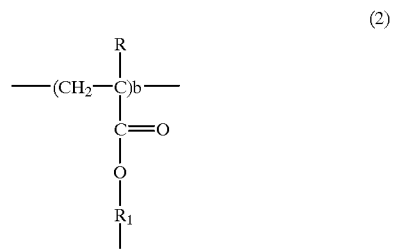

wherein R represents hydrogen or an alkyl group having 1 to 5 carbon atoms and $R_1$ represents an alkylene group having 2 to 4 carbon atoms.

5. The liquid crystal display device according to claim 4, wherein the copolymer resin further comprises 0 to 75% by mole of constituent units represented by formula (3) and 0 to 75% by mole of constituent units represented by formula (4):

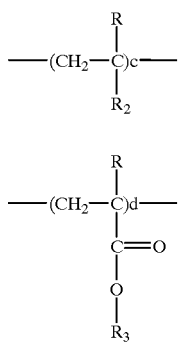

wherein R represents hydrogen or an alkyl group having 1 to 5 carbon atoms, $R_2$ represents an aromatic carbon ring, and $R_3$ represents an alkyl group or an aralkyl group.

6. A process for producing a liquid crystal display device, comprising the steps of: providing substrates between which a liquid crystal for a liquid crystal display device is to be sandwiched and supported; coating a photosensitive resin composition onto at least one of the substrates in its portions, where the liquid crystal is to be sandwiched and supported, to a thickness of spacers; providing a photomask, on the coating, such that light is not applied to the coating in its portions other than spacer-forming portions; exposing the coating; and developing the exposed coating to form a photocured resin layer as spacers, the photocured resin layer having such properties that, as determined by the measurement of dynamic viscoelasticity in the temperature range of −40° C. to 80° C., the storage modulus (E') is not more than $5.0 \times 10^9$ Pa with the loss tangent {tan δ=E" (loss modulus)/E'} being not more than 0.1 and, as determined by the measurement of dynamic viscoelasticity in the temperature range of 120° C. to 180° C., the storage modulus (E') is not less than $5.0 \times 10^7$ Pa with the loss tangent {tan δ=E" (loss modulus)/E'} being not more than 0.3.

7. A process for producing a liquid crystal display device, comprising the steps of: providing substrates between which a liquid crystal for a liquid crystal display device is to be sandwiched and supported; coating a photosensitive resin composition onto at least one of the substrates in its portions, where the liquid crystal is to be sandwiched and supported, to a thickness of spacers; providing a photomask, on the coating, such that light is not applied to the coating in its portions other than spacer-forming portions; exposing the coating; and developing the exposed coating to form a photocured resin layer as spacers, the photocured resin layer having a Young's modulus, derived from a stress-strain curve, of not more than 10,000 MPa at 25° C. and not less than 10 MPa at 150° C.

8. A process for producing a liquid crystal display device, comprising the steps of: providing substrates between which a liquid crystal for a liquid crystal display device is to be sandwiched and supported; coating a photosensitive resin composition onto at least one of the substrates in its portions, where the liquid crystal is to be sandwiched and supported, to a thickness of spacers; providing a photomask, on the coating, such that light is not applied to the coating in its portions other than spacer-forming portions; exposing the coating; and developing the exposed coating to form a photocured resin layer as spacers, the photocured resin layer having a dynamic hardness of 30 to 60 under load.

9. The process according to any one of claim 6, wherein said photocurable resin composition comprises: a copolymer resin; a bifunctional or higher polyfunctional photopolymerizable acrylate monomer or oligomer; an epoxy resin; and an initiator, said copolymer resin comprising 5 to 55% by mole of constituent units represented by formula (1) and 5 to 95% by mole of constituent units represented by formula (2), the constituent units represented by formula (1) having been partially reacted, through carboxyl groups thereof, with a (meth)acryloylalkyl isocyanate compound, the constituent units represented by formula (2) having been partially reacted, through hydroxyl groups thereof, with a (meth)acryloylalkyl isocyanate compound, said copolymer resin containing 5 to 95% by mole of (meth)acryloyl groups and having an acid value of 5 to 400 mg KOH/g and a weight average molecular weight of 10,000 to 1,000,000 as determined using polystyrene as a standard:

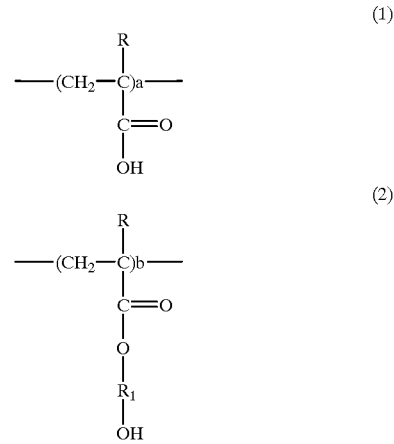

wherein R represents hydrogen or an alkyl group having 1 to 5 carbon atoms and $R_1$ represents an alkylene group having 2 to 4 carbon atoms.

10. The process according to claim 9, wherein the copolymer resin further comprises 0 to 75% by mole of constituent units represented by formula (3) and 0 to 75% by mole of constituent units represented by formula (4):

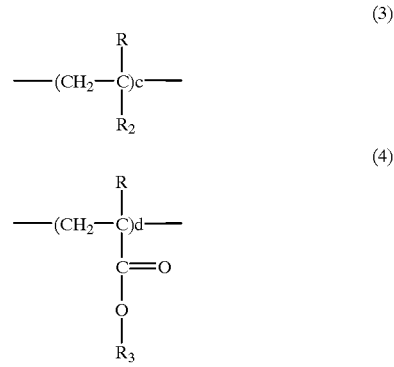

wherein R represents hydrogen or an alkyl group having 1 to 5 carbon atoms, $R_2$ represents an aromatic carbon ring, and $R_3$ represents an alkyl group or an aralkyl group.

* * * * *